United States Patent [19]

Mahling

[11] Patent Number: 5,591,513

[45] Date of Patent: Jan. 7, 1997

[54] RUBBER ARTICLE COMPRISING BASIC AMINO-GROUP CONTAINING, AROMATIC ANTI-OXIDANTS AND HAVING A NON-BLACK AREAL MEMBER

[75] Inventor: Rolf Mahling, Korbach, Germany

[73] Assignee: Continental Aktiengesellschaft, Hanover, Germany

[21] Appl. No.: 303,443

[22] Filed: Sep. 9, 1994

[30] Foreign Application Priority Data

Sep. 10, 1993 [DE] Germany .................. 43 30 700.0

[51] Int. Cl.$^6$ .................. B32B 5/16; B60C 13/00
[52] U.S. Cl. .................. 428/143; 152/524; 152/525; 152/DIG. 12; 428/149; 428/192; 428/194; 428/304.4; 428/306.6; 428/307.3; 428/317.9; 428/323; 428/331; 428/343; 428/344; 428/493
[58] Field of Search .................. 428/143, 148, 428/149, 206, 207, 323, 328, 331, 304.4, 306.6, 307.3, 317.9, 312.2, 192, 194, 446, 492, 493, 913.3, 542.8, 343, 344; 152/524, 525, DIG. 12; 524/442, 492, 495, 779, 786, 925

[56] References Cited

U.S. PATENT DOCUMENTS

| | | | |
|---|---|---|---|
| 2,979,099 | 4/1961 | Rowe | 152/524 |
| 3,073,371 | 1/1963 | Leeper | 152/524 |
| 4,153,772 | 5/1979 | Schwesig et al. | 526/308 |
| 4,461,795 | 7/1984 | Ogawa | 428/64 |
| 4,946,881 | 8/1990 | Cornell et al. | 524/100 |
| 5,058,647 | 10/1991 | Gartland et al. | 152/524 |
| 5,135,797 | 8/1992 | Sasaki | 428/201 |
| 5,162,409 | 11/1992 | Mroczkowski | 524/262 |

FOREIGN PATENT DOCUMENTS 87-194518/28  11/1985  Japan .

*Primary Examiner*—Hoa T. Le
*Attorney, Agent, or Firm*—Robert W. Becker & Associates

[57] ABSTRACT

A rubber article has a rubber base body and a non-black areal member attached to the surface of the rubber base body. The rubber base body is made of a rubber compound containing at least one a basic, amino-group containing, aromatic anti-oxidant. The non-black areal member contains inorganic acidic components.

21 Claims, 1 Drawing Sheet

RUBBER ARTICLE COMPRISING BASIC AMINO-GROUP CONTAINING, AROMATIC ANTI-OXIDANTS AND HAVING A NON-BLACK AREAL MEMBER

BACKGROUND OF INVENTION

The present invention relates to a rubber article, especially a tire, an air spring, or a drive belt, comprising at least one basic, amino-group containing, aromatic anti-oxidant and having a non-black areal member applied to the surface of the rubber article. The areal member is, for example, in the form of symbols such as letters and/or numbers and/or trademarks and/or pictograms. In the case of tires, complete sidewalls may be formed by such an areal member.

The term non-black areal member in the context of the present application is defined as a material of a white and/or colored appearance the composition of which will be explained in detail in this application. In order to avoid confusion as to the term "basic", it is noted herewith that "basic" is used in the chemical sense.

Rubber articles are provided for decorative purposes and/or identification purposes with colored areal member as described above. These areal members, for example, may represent letters, numbers, pictograms, or trademarks. It is, however, also possible to provide sidewalls for tires with such non-black areal members.

The non-black areal members are generally not glued to the rubber articles, but vulcanized onto it. The non-black areal members are thus permanently connected with the rubber base body of the rubber article. However, the anti-oxidant materials contained in the rubber article present a great problem. Conventional anti-oxidants, for example, para-phenylenediamine, are basic and function as radical scavengers. When conventional non-black areal members are applied to rubber articles which contain such basic anti-oxidants, the aforementioned anti-oxidants diffuse slowly into the non-black areal members and react at the exposed top side of the non-black areal member in the presence of light with oxygen contained in the air. Due to the aromatic character of the conventional anti-oxidants dark colored reaction products result. The resulting discoloration of the non-black surface of the non-black areal members have an unpleasant appearance and are rejected by buyers; they are therefore undesirable for the manufacturer.

It has been suggested to design the rubber article onto which the non-black areal members are to be applied without substances that result in discoloration; however, this requires separate manufacturing series for the rubber compounds to be employed and the use of expensive polymers because the use of inexpensive but very effective basic, amino group containing, aromatic anti-oxidants is no longer possible.

The layer of the non-black areal member facing the rubber base body can be comprised of non-polar polymers. These layers made of non-polar polymers impede diffusion of the polar anti-oxidants from the rubber base body into the upper side of the non-black areal member. The disadvantage of this approach for rubber articles with non-black areal members is that a layer of non-polar polymers impedes the diffusion of the polar anti-oxidants to some extent, but cannot completely prevent their diffusion. Accordingly, a discoloration of the light-colored surfaces can only be delayed by means of such a barrier, whereby however this delay is not sufficient to coincide with the service life of the rubber articles.

It is also known to use halides of dicarboxylic acids in order to prevent migration of anti-oxidants from the interior of a rubber mixture to its surface (Derwent 87-194518/28). In the disclosed reference the use of adhesive labels on the tires is also discussed.

However, when using such substances at conventional vulcanization temperatures, volatile hydrogen halides will result. These hydrogen halides have a damaging (toxic) effect on plants and animals including humans, especially by attacking sensitive respiratory organs. Furthermore, the resulting hydrogen halide causes corrosion of metals thereby damages apparatus and devices etc.

It is therefore an object of the present invention to provide environmentally safe rubber articles with non-black areal members, for example, white or colored areal members, whereby the non-black areal members despite the use of basic, amino-group containing, aromatic anti-oxidants in the rubber compound of the rubber article do not result in a discoloration of the areal members.

SUMMARY OF THE INVENTION

A rubber article comprised of a rubber base body and a non-black areal member attached to the surface of the rubber base body wherein the rubber base body contains at least one basic, amino-group containing, aromatic anti-oxidant, and wherein the non-black areal member comprises inorganic acidic components.

Preferably, the inorganic acidic components are acidic adsorbents selected from the group consisting of precipitated silicic acid, acidic carbon black, and aluminum hydroxide.

Preferably, the inorganic acidic components are selected from the group consisting of low-volatile inorganic acids and low-volatile salts of the inorganic acids.

Advantageously, the non-black areal member further comprises porous substances wherein the acidic components are stored in the porous substances. Preferably, the porous substances are selected from the group consisting of zeolites, carbon black, activated carbon, and wood meal.

Expediently, the non-black areal member has a polymer layer facing the rubber base body, the polymer layer comprised of non-polar polymers that at least partially impede passage of polar substances through the polymer layer.

In another embodiment of the present invention, the non-black areal member has a top side with edges. On the edges colored, dynamically loadable prints are provided.

Preferably, the non-black areal member has an underside provided with a vulcanizable adhesive layer that is permanently adhesive and contains polyterpenes.

Advantageously, the non-black areal member comprises at least one pre-vulcanized layer.

Expediently, the non-black areal member comprises a plurality of layers and more than one of the layers comprises the inorganic acidic components.

The present invention is furthermore concerned with a non-black areal member for attaching to a rubber article, respectively, its base body. The non-black areal member is comprised of a plurality of layers made of rubber and/or plastic, wherein the non-black areal member contains inorganic acidic components.

Preferably, the inorganic acidic components are acidic adsorbents selected from the group consisting of precipitated silicic acid, acidic carbon black, and aluminum hydroxide.

In another embodiment of the present invention, the inorganic acidic components are selected from the group consisting of low-volatile inorganic acids and low-volatile salts of the inorganic acids.

Advantageously, the non-black areal member further comprises porous substances, wherein the acidic components are stored in the porous substances. Preferably, the porous substances are selected from the group consisting of zeolites, carbon black, activated carbon, and wood meal.

Preferably, one of the layers is a polymer layer to be positioned so as to face the rubber article to which the non-black areal member is to be attached, the polymer layer comprised of non-polar polymers that at least partially impede passage of polar substances through the polymer layer.

Advantageously, one of the layers is a top side with edges. On the edges colored, dynamically loadable prints are provided.

Preferably, one of the layers is a vulcanizable adhesive layer that forms an underside of the non-black areal member, the adhesive layer being permanently adhesive and containing polyterpenes. Preferably, the non-black areal member in this embodiment further comprises a support foil placed on the adhesive layer.

Preferably, the layers comprise at least one pre-vulcanized layer.

In a preferred embodiment of the present invention, more than one of the layers comprises the inorganic acidic components.

The present invention is based on the knowledge that a component comprised of ions will move and migrate only slowly, if at all. The inventor has furthermore recognized that the acidic inorganic components, for example, phosphoric acid or gypsum, form salts with the basic anti-oxidants, for example, phenylene diamine. These salts, comprised of ions, are not able to migrate to the upper side of the attached colored areal member where, in the presence of light and oxygen contained in the air, they would otherwise be transformed into discoloring reaction products. At the surface these salts can hardly form because their formation requires the presence of amines which, however, are present only in the deeper layers of the non-black areal member where they are scavenged by reaction with the acidic components to form salts which are unable to migrate.

In a preferred embodiment of the present invention, the non-black areal member is comprised of a plurality of layers. Due to this multi-layer design it is possible to distribute the acidic components over a plurality of layers whereby the contents and/or the kind of acidic inorganic components within the different layers can be varied.

In another preferred embodiment of the present invention the acidic inorganic components of the non-black areal member are contained in a layer of the areal member which is facing the rubber base body of the rubber article so that this layer, after application to the rubber article, is positioned directly adjacent to the base body of the rubber article. In this embodiment the color of the areal member is especially well protected because the strongest barrier is farthest away from the visible surface of the areal member.

It is furthermore very advantageous that the acidic inorganic components are comprised of acidic adsorbent material such as precipitated silicic acid, acidic carbon black and/or aluminum hydroxide whereby the latter is made acidic with a corresponding manufacturing process. The use of the aforementioned acidic adsorbent materials is especially advantageous because, in addition to the aforementioned neutralization reactions, (salt formation), adsorption processes can take place so that passage of the anti-oxidants to the surface of the non-black areal member is additionally made more difficult.

In another embodiment of the present invention acidic inorganic components in the form of low-volatile inorganic acids (phosphoric acid, sulfuric acid) and/or their salts are used during the manufacture of the non-black areal member. It is especially advantageous when the aforementioned acidic components are contained in storage means, which can be in the form of porous substances. These porous substances can be preferably zeolites, carbon black, activated carbon, and/or wood meal.

In yet another embodiment of the present invention the innermost layer of the areal member in direct contact with the rubber base body is made preferably of non-polar polymers which impede the migration of polar substances through this layer to a great extent. The anti-oxidants which are impeded in their migration by such a barrier (as is known in the prior art) upon further migration to the visible surface of the non-black areal member are scavenged by the inventively provided acidic inorganic components so that no disturbing discoloration can occur.

According to another preferred embodiment of the inventive rubber article, the edges of the visible upper side of the non-black areal member are provided with dynamically loadable, preferably dark-colored prints are provided. The prints are preferably comprised of natural rubber or EPDM (ethylene-propylene-diene monomer rubber) and serve to mask anti-oxidants which might migrate into the upper visible surface of the areal member from the sides. Since anti-oxidants entering from the sides must not penetrate the entire non-black areal member, they can reach the upper side of the non-black areal member despite the presence of barriers or acidic components and may cause discolorations.

Preferably, at least one layer of the non-black areal member is pre-vulcanized. The prevulcanization of the edges and their prints as well as the symbols (letters, numbers, trademarks, pictograms etc. is also advantageous. This results in a sufficiently distortion free application of the non-black areal member onto the base body of the rubber article.

For ensuring a long service life of the non-black areal member on the rubber article, a special adhesive layer may be provided at the side of the non-black areal member which is facing the base body of the rubber article. This adhesive layer should be comprised of a permanently adhesive and/or vulcanizable polymer layer which contains polyterpenes, preferably 20 to 50 weight %. Such a layer ensures an excellent attachment of the non-black areal member on already vulcanized rubber articles so that optionally a further vulcanization step of the contact location between the non-black areal member and the rubber article may be omitted. It is especially expedient when the adhesive layer of the non-black areal member is provided with a support foil which protects the adhesive layer during storage and during transport against soiling and also provides for an improved handling during transport and application.

Especially advantageous is the application of non-black areal members on air springs, drive belts and/or tires. Due to the visual contrast between the conventional black rubber article a visually well recognizable marking of the article is possible. A colored design of sidewalls, for example, of tires is also possible with such non-black areal members. This has the advantage that no separate mixtures of light-colored rubber mixtures must be produced. Light-colored rubber mixtures have the disadvantage that the admixed pigments have a negative effect on the mechanical properties of the vulcanized product. With inventively manufactured rubber articles, for example, colored tire sidewalls, this disadvantage can be overcome and at the same time long-term improved visual properties can be achieved.

BRIEF DESCRIPTION OF THE DRAWINGS

The only drawing

DESCRIPTION OF PREFERRED EMBODIMENT

Figure 1:
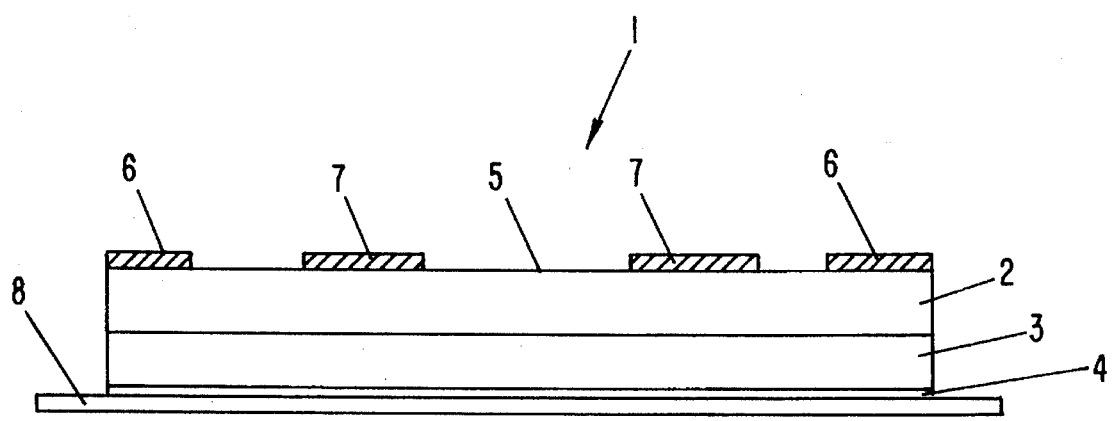
FIG. 1 shows a cross-section of an inventive multi-layer, non-black areal member.

The present invention will now be described in detail with the aid of several specific embodiments utilizing the only FIG. 1.

A non-black areal member 1 comprised of a plurality of layers 2, 3, 4, is provided at its outermost surface 5 with colored printed symbols or prints 6, 7. The symbols may be letters, numbers, trademarks, pictograms etc. The layer 2 is comprised preferably of dynamically stable polymers and contains inventively inorganic acidic components, for example, precipitated silicic acid, acidic carbon black, and/or aluminum hydroxide. It is also possible that one or more of the layers 2 to 4 contain porous materials such as zeolites, carbon black, activated carbon, and/or wood meal etc.

These porous materials may contain in their pores acidic inorganic components, such as, for example, inorganic acids and/or their salts.

The thin-layered printed symbols or prints 6, 7 are applied to the layer 2 and are preferably prevulcanized. The layer 2 is advantageously also prevulcanized. The colored prints 6 are arranged at the lateral edges of the represented non-black areal member 1 so that anti-oxidants from the rubber article which may enter the non-black areal member 1 from the sides cannot reach the surface of the member 1 which would otherwise cause discoloration.

The represented embodiment is provided with a barrier layer 3 which is preferably comprised of a non-polar or at least substantially non-polar polymer or a polymer mixture. The anti-oxidants which cause a discoloration have a certain polarity so that their migration through the barrier layer 3 into the non-black areal member 1 is at least partially prevented. In another embodiment these barrier layers 3 can also be provided with the inventively applied acidic inorganic components and/or adsorbent materials.

A vulcanizable adhesive layer 4 which is permanently adhesive can contain polyterpenes, preferably 35 weight %, and serves as a permanent connection of the non-black areal member 1 to the corresponding base body of the rubber article, especially tires, air springs, or drive belts. A support foil 8 which is placed onto the adhesive layer 4 has the purpose of protecting the adhesive layer 4 of the non-black areal member 1 against soiling before its application to the rubber article and of improving handling of the non-black areal member 1.

The present invention can be summarized as follows:

The invention relates to rubber articles, especially tires, air springs, or drive belts, with at least one basic, amino-group containing, aromatic anti-oxidant having a non-black areal member 1 applied to the base body of the rubber article, for example in the form of letters and/or numbers and/or trademarks, and/or pictograms. In the case of tires, complete sidewalls can be formed by the areal member.

In order to counter or prevent in an envioronmentally safe manner a discoloration of the non-black areal member due to migration of the basic, amino-group containing, aromatic anti-oxidants from the rubber article into the non-black areal member, it is suggested that the non-black areal member contain inorganic acidic components.

The present invention is, of course, in no way restricted to the specific disclosure of the specification and drawings, but also encompasses any modifications within the scope of the appended claims.

What I claim is:

1. A rubber article comprising a rubber base body and a non-black areal member of rubber and/or plastic attached to the surface of said rubber base body, wherein said rubber base body contains at least one basic, amino-group containing, aromatic anti-oxidant, and wherein said non-black areal member comprises inorganic acidic components, wherein said at least one basic, amino-group containing, aromatic anti-oxidant and said inorganic acidic components form salts upon migration of said at least one basic, amino-group containing, aromatic anti-oxidant into said non-black areal member.

2. A rubber article according to claim 1, wherein said inorganic acidic components are acidic adsorbents selected from the group consisting of precipitated silicic acid, acidic carbon black, and aluminum hydroxide.

3. A rubber article according to claim 1, wherein said inorganic acidic components are selected from the group consisting of phosphoric acid sulfuric acid and salts of said phosphoric and said sulfuric acids.

4. A rubber article according to claim 1, wherein said non-black areal member further comprises porous substances, wherein said acidic components are stored in said porous substances.

5. A rubber article according to claim 4, wherein said porous substances are selected from the group consisting of zeolites, carbon black, activated carbon, and wood meal.

6. A rubber article according to claim 1, wherein said non-black areal member further comprises a polymer layer facing said rubber base body, wherein said polymer layer is comprised of non-polar polymers that at least partially impede passage of polar substances contained in said rubber base body through said polymer layer into said non-black areal member.

7. A rubber article according to claim 1, wherein said non-black areal member has a top side, facing away from said rubber base body, with edges and wherein on said edges colored, dynamically loadable symbols are printed.

8. A rubber article according to claim 1, wherein said non-black areal member has an underside, facing said rubber base body, provided with a vulcanizable adhesive layer that is permanently adhesive, contains polyterpenes, and is placed onto said surface of said rubber base body.

9. A rubber article according to claim 1, wherein said non-black areal member comprises at least one pre-vulcanized layer.

10. A rubber article according to claim 1, wherein said non-black areal member comprises a plurality of layers and wherein more than one of said layers comprises said inorganic acidic components.

11. A non-black areal member for attaching to a rubber article containing at least one basic, amino-group containing, aromatic anti-oxidant, said non-black areal member comprised of a plurality of layers made of a material selected from the group consisting of rubber and plastic, said non-black areal member containing inorganic acidic components for forming salts with the at least one basic, amino-group containing, aromatic anti-oxidant migrating from the rubber article into said non-black areal member.

12. A non-black areal member according to claim 11, wherein said inorganic acidic components are acidic adsorbents selected from the group consisting of precipitated silicic acid, acidic carbon black, and aluminum hydroxide.

13. A non-black areal member according to claim 11, wherein said inorganic acidic components are selected from the group consisting of phosphoric acid sulfuric acid and salts of said phosphoric and said sulfuric acids.

14. A non-black areal member according to claim 11, further comprising porous substances, wherein said acidic components are stored in said porous substances.

15. A non-black areal member according to claim 14, wherein said porous substances are selected from the group consisting of zeolites, carbon black, activated carbon, and wood meal.

16. A non-black areal member according to claim 11, wherein one of said layers is a polymer layer positioned within said plurality of layers such that said polymer layer faces the rubber article to which said non-black areal member is to be attached, wherein said polymer layer is comprised of non-polar polymers that at least partially impede passage of polar substances contained in said rubber article through said polymer layer into said non-black areal member.

17. A non-black areal member according to claim 11, wherein one of said layers is a top side, facing away from said rubber article, with edges and wherein on said edges colored, dynamically loadable symbols are printed.

18. A non-black areal member according to claim 11, wherein one of said layers is a vulcanizable adhesive layer that forms an underside of said non-black areal member, said underside facing said rubber article for attachment thereto, wherein said adhesive layer is permanently adhesive, contains polyterpenes, and is placed onto said rubber article.

19. A non-black areal member according to claim 18, further comprising a support foil placed on said adhesive layer and removed before placing said adhesive layer onto said rubber article.

20. A non-black areal member according to claim 11, wherein said layers comprise at least one pre-vulcanized layer.

21. A non-black areal member according to claim 11, wherein more than one of said layers comprises said inorganic acidic components.

\* \* \* \* \*